United States Patent [19]

Butterworth

[11] 3,901,129
[45] Aug. 26, 1975

[54] FLUID PRESSURE OPERATED RECIPROCATING MOTORS

[75] Inventor: Philip Butterworth, Cockermouth, England

[73] Assignee: Butterworth Hydraulic Developments Limited, London, England

[22] Filed: Apr. 27, 1973

[21] Appl. No.: 355,006

[30] Foreign Application Priority Data
May 1, 1972 United Kingdom............... 20155/72

[52] U.S. Cl. .................... 91/299; 91/319; 91/447
[51] Int. Cl. ............................................. F01l 25/04
[58] Field of Search ................... 91/317, 299, 319

[56] References Cited
UNITED STATES PATENTS

| | | | |
|---|---|---|---|
| 303,703 | 8/1884 | Carricaburu........................ | 91/317 |
| 1,248,966 | 12/1917 | Wilhelm................................ | 91/317 |
| 2,970,579 | 2/1961 | Paris.................................... | 91/317 |

*Primary Examiner*—Paul E. Maslousky
*Attorney, Agent, or Firm*—Stevens, Davis, Miller & Mosher

[57] ABSTRACT

A fluid pressure operated motor for producing reciprocating motion in which each of a pair of spool working chambers is respectively in communication with one of a pair of piston chambers by way of a non-return valve which opens communication between its associated spool working chamber and piston chamber when fluid pressure in the spool working chamber exceeds that in the associated piston chamber and closes communication between its associated spool working chamber and piston chamber when fluid pressure in the piston chamber exceeds that in the associated spool working chamber; each piston chamber has an exhaust port which is so located that, during axial movement of the piston, the one of such exhaust ports through which the contracting piston chamber is exhausting is closed by the piston towards its end of stroke; and wherein a valve element is provided which is responsive to axial movement of the piston, the valve element being adapted to open communication between the contracting piston chamber and the spool working chamber associated therewith so that fluid displaced from the contracting piston chamber acts at least partly to reverse the spool when the exhaust port associated with the contracting piston chamber is closed, and subsequently to close communication between the contracting piston chamber and the spool working chamber associated therewith prior to the piston reaching its end of stroke so that, with the non-return valve associated with the contracting piston chamber closed and the valve element closed, the fluid in the piston chamber is trapped to provide a dashpot arrangement for arresting the piston at its end of stroke.

14 Claims, 1 Drawing Figure

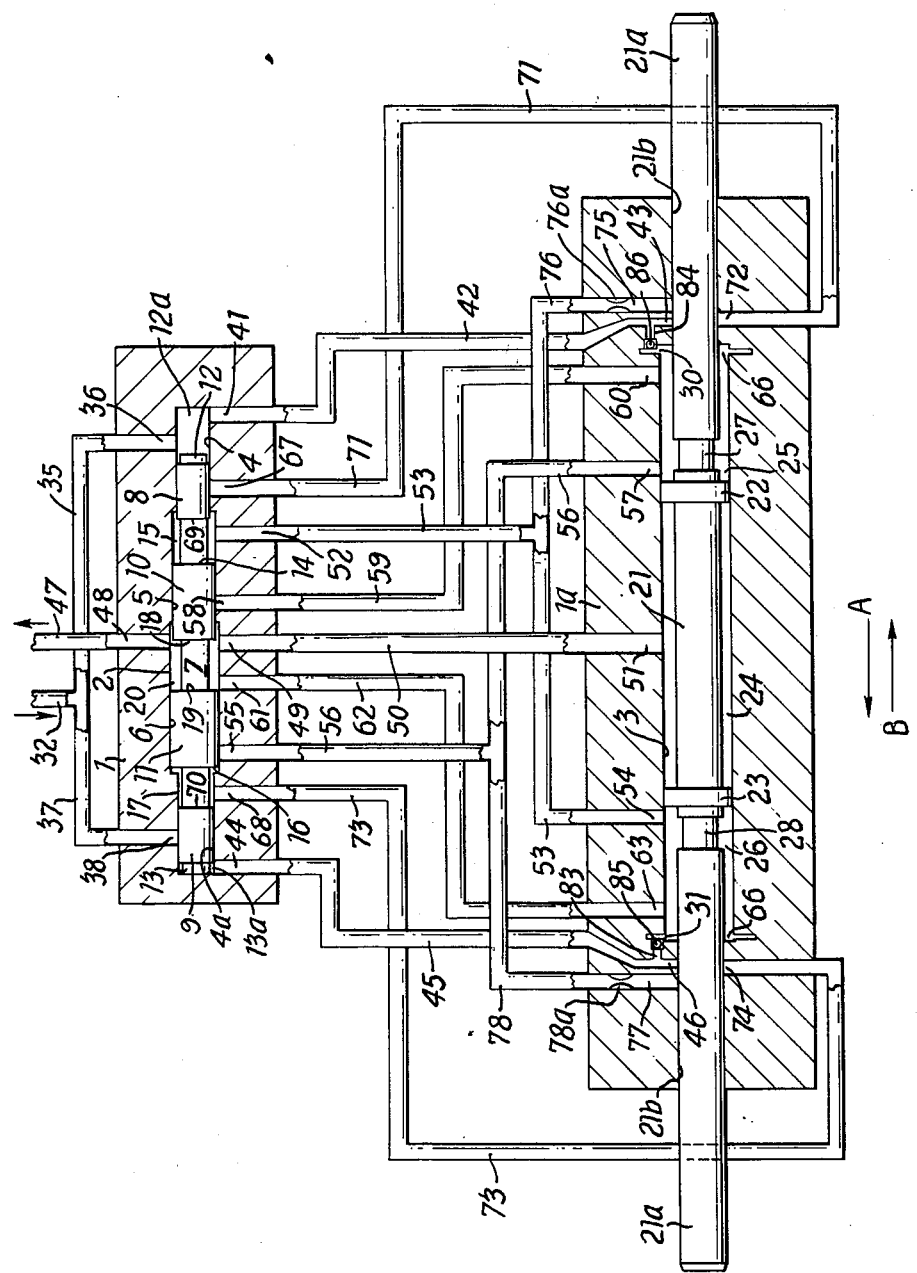

FLUID PRESSURE OPERATED RECIPROCATING MOTORS

This invention relates to fluid pressure operated motors for producing reciprocatory motion and is directed to an improvement in or modification of the invention in our British Pat. No. 1,283,525.

It has hitherto been proposed to provide a fluid pressure operated motor of the type in which a spool, axially slidable in a spool cylinder, controls reciprocation of a piston which is axially slidable in a piston cylinder and the position of the piston in its cylinder controls axial movement of the spool. In such type motors the piston is generally double acting and movement of the spool is effected by variations in fluid pressure applied to a pair of opposed faces on the spool.

In accordance with the invention which is the subject of our above mentioned British Pat. No. 1,283,525, there is provided a fluid pressure operated motor (hereinafter referred to as "of the kind specified") for producing reciprocating motion which includes;

a spool axially slidable in a spool cylinder, the spool having a first pair of opposed faces each of which respectively partly defines one of a pair of spool working chambers in the spool cylinder, and a second pair of opposed faces each of which respectively partly defines one of a pair of spool biasing chambers in the spool cylinder;

a piston axially slidable in a piston cylinder, the piston being double acting and having a pair of opposed faces such of which respectively partly defines one of a pair of piston chambers, reversal of the piston being initiated by reversal of the spool which serves to connect one piston chamber alternately to fluid pressure and to exhaust and to connect the other piston chamber alternately to exhaust and to fluid pressure respectively;

and wherein the timing of reversal of the spool is determined according to the position of the piston in its cylinder, and the motor is arranged so that with the spool at an end of its stroke, one spool working chamber is open to fluid pressure while the other spool working chamber is open to exhaust to urge the spool to that end and one spool biasing chamber is open to exhaust and, to reverse the spool, fluid pressure in both spool working chambers is caused to apply equal and opposite axial thrusts on the spool and fluid pressure is caused to be admitted to the other spool biasing chamber in opposition to the load on the spool applied by fluid pressure in said one spool working chamber.

According to the present invention there is provided a fluid pressure operated motor of the kind specified for producing reciprocating motion in which each of the pair of spool working chambers is respectively in communication with one of the pair of piston chambers by way of a non-return valve which opens communication between its associated spool working chamber and piston chamber when fluid pressure in the spool working chamber exceeds that in the associated piston chamber and closes communication between its associated spool working chamber and piston chamber when fluid pressure in the piston chamber exceeds that in the associated spool working chamber. Each piston chamber has an exhaust port which is so located that, during axial movement of the piston, the one of such exhaust ports through which the contracting piston chamber is exhausting is closed by the piston towards its end of stroke; and wherein valve means is provided which is responsive to axial movement of the piston, said valve means being adapted to open communication between the contracting piston chamber and the spool working chamber associated therewith so that fluid displaced from the contacting piston chamber acts at least partly to reverse the spool when the exhaust port associated with the contracting piston chamber is closed, and subsequently to close communication between the contracting piston chamber and the spool working chamber associated therewith prior to the piston reaching its end of stroke so that, with the non-return valve associated with the contracting piston chamber closed and the valve means closed, the fluid in said piston chamber is trapped to provide a dashpot arrangement for arresting the piston at its end of stroke.

It is to be realized that by the term "fluid" as used throughout this Specification we include both liquid (for a hydraulically operated motor) and gas (for a pneumatically operated motor) - although the former type of fluid is preferred. Preferably the valve means is adapted to open communication between the contracting piston chamber and the spool working and biasing chambers associated therewith so that fluid displaced from the contracting piston chamber acts at least partly to reverse the spool when the exhaust port associated with the contracting piston chamber is closed, and subsequently to close communication between the contracting piston chamber and the spool working and biasing chambers associated therewith prior to the piston reaching its end of stroke and the dashpot arrangement becoming effective.

By the present invention the formation of the dashpot arrangements to arrest the piston at its ends of stroke allows the kinetic energy of the piston (and of a load which it may carry) to be dissipated in compressing the fluid in the dashpots. The energy stored in the dashpot fluid so compressed may then be utilized to accelerate the piston for its initial axial movement immediately after reversal, that is to say the fluid in the dashpots provides effective springs from which the piston bounces at its ends of stroke. Provided that no fluid is lost from the dashpot due to leakage, in theory the piston will leave the dashpot on expansion of the compressed fluid at substantially the same speed as that at which it entered the dashpot. In practice it is likely that there will be some fluid leakage from the dashpot but, nevertheless, the provision of the dashpot is believed to provide a rapid and efficient means of reversing the piston at its end of stroke.

After the piston has bounced from the fluid spring provided by the dashpot (that is after the direction of axial movement of the piston has been reversed), fluid under pressure is passed into the now expanding piston chamber by way of the non-return valve associated therewith, and such non-return valve and the spool working chamber with which it communicates are arranged to be in communicationn with fluid under pressure as a result of displacement of the spool.

The non-return valve should be in substantially continual communication with its respectively associated piston chamber since it must be ensured that, after reversal of the piston, fluid under pressure can flow by way of the non-return valve into the expanding piston chamber to provide continuous movement of the piston. Preferably a port through which each non-return valve communicates with ite respectively associated piston chamber is loaded to be in constant communication with that piston chamber. The possibility is realized however of locating the port through which fluid under pressure can enter the expanding piston chamber by way of the non-return valve associated therewith so that such port is closed by the piston for a very short period of time when the piston is at its point of reversal (that is when the fluid in the dashpot is at its maximum compression) and so that expansion of the compressed dashpot fluid will cause the piston to move sufficiently after reversal to open such port and thereby communication between the non-return valve and the piston chamber; this latter type of arrangement is not preferred since the possibility may arise whereby, on assembly of the motor, the piston is located so that it closes the port between the non-return valve and its respectively associated contracted piston chamber which could result in a stalled condition of the motor.

The wave means responsive to movement of the piston conveniently comprises co-operating ports and lands between the piston and its cylinder or between a piston rod and a bore through which it is slidable. In addition to opening communication between the contracting piston chamber and the spool working chamber associated therewith, the valve means may be utilized as mentioned above to open communication between the contracting piston chamber and the spool biasing chamber which, when pressurized, biases the spool in the same sense of axial direction as the spool working chamber associated with the contracting piston chamber when pressurized. In a preferred embodiment the valve means serves to open communication simultaneously between the contracting piston chamber, the spool working chamber associated with said contracting piston chamber, and the spool biasing chamber which, when pressurized, biases the spool in the same sence of axial direction as the spool working chamber. Alternatively, the valve means may be arranged to open communication between the spool biasing chamber and the contracting piston chamber slightly before it opens communication between the spool working chamber and the contracting piston chamber or vice versa. However, to provide the effective dashpot arrangement in the contracting piston chamber without developing high peak pressures in the spool working chamber (and also in the spool biasing chamber if such chamber is in communication by way of the valve means with the contracting piston chamber) which peak pressures could result in premature reversal of the spool, the valve means is arranged to close communication between the contracting piston chamber and the spool chamber or chambers associated therewith to form the dashpot arrangement slightly before the piston reaches its end of stroke. The valve means shoud preferably be open for a sufficient period during the stoke of the piston immediately after the exhaust port through which the contracting piston chamber was exhausting has closed to permit sufficient fluid to be displaced from the contracting piston chamber by way of the valve means to the spool chamber or chambers so that the spool is axially displaced sufficiently to open communication between fluid pressure and the spool working chamber which communicates with the contracted piston chamber by way of the non-return valve.

One embodiment of the present invention will now be described, by way of example only, with reference to the accompanying illustrative drawing which shows a fluid pressure operated motor constructed in accordance with the present invention and in part section taken along the longitudinal axis of the spool and piston.

The motor illustrated includes a body part 1 which defines a spool cylinder shown generally at 2 and a body part 1a which defines a piston cylinder 3. The spool cylinder 2 is stepped to provide end parts 4 and 4a of equal diameter and adjacent mid parts 5 and 6. Spool cylinder part 4 communicates with part 5 and cylinder part 5 is of larger diameter than cylinder part 4. Spool cylinder part 4a communicates with cylinder part 6 and cylinder part 6 is of larger diameter than cylinder part 5. Axially slidable in the spool cylinder 2 is a spool shown generally at 7 which comprises end lands 8 and 9 which are respectively slidable in cylinder end parts 4 and 4a and lands 10 and 11 which are respectively slidable in cylinder parts 5 and 6. One end of the spool 7 is provided with a rod 12 and the other end of the spool is provided with a rod 13. The end face of the spool 7 adjacent the rod 12 defines with its adjacent end of the spool cylinder part 4 a spool working chamber 12a and the opposite end face of the spool 7 adjacent the rod 13 defines with its adjacent end of the spool cylinder part 4a a second spool working chamber 13a. The rods 12 and 13 provide physical limits to axial movement of the spool in its cylinder and may be castellated to ensure that fluid under pressure can flow over the ends of the spool when it is located at one or other end of its stroke in the spool cylinder. In fact, in the present embodiment (and as will be apparent from the following description), the physical limitation of the stroke is only precautionary since the hydraulic operation is so arranged that the stroke is limited hydraulically.

The spool land 10 has a side face 14 which is located adjacent the spool land 8 and partly defines with the adjacent stepped end of the cylinder part 5 a spool biasing chamber 15. Similarly, the spool land 11 has a side face 16 which is located adjacent the spool land 9 and partly defines with the adjacent stepped end of the cylinder part 6 a further spool biasing chamber 17. The spool lands 10 and 11 have opposed side faces 18 and 19 respectively which define, with the adjacent ends of the cylinder parts 5 and 6, a spool transfer chamber 20.

Slidably housed in the piston cylinder 3 is a piston shown generally at 21 having rods 21a extending axially and in a sealed manner through bores 21b in the end walls of the body part 1a and also having a pair of axially spaced lands 22 and 23. Defined between the opposed side faces of the lands 22 and 23 and part length of the piston cylinder 3 is a piston transfer chamber 24; defined between the piston land 22 and one end part of the piston cylinder 3 is a first piston chamber 25; and defined between the piston land 23 and the other end part of the piston cylinder 3 is a second piston chamber 26. An annular recess 27 is provided in the piston rod 21a adjacent the piston land 22 and on the side thereof in the chamber 25; similarly a further annular recess 28 is provided in the piston rod 21a adjacent the piston land 23 and on the side thereof in the chamber 26. The annular recesses 27 and 28 are so arranged that in the unlikely event of the piston 21 being located at one or other extreme end of its stroke (which is ultimately determined by the piston lands 22 and 23 abutting their respective ends of the piston cylinder 3) the annular recess 27 will be in communication with a port 75 in the bore 21b or the annular recess 28 will be in communication with a port 77 in the bore 21b. Normally the ports 75 and 77 are closed by the full diameter of the piston rods 21a.

The motor is provided with an inlet port 32 which is adapted to be connected to a source of fluid (preferably hydraulic) under pressure. The inlet port 32 communicates through a passage 35 with a pressure inlet port 36 which is located in the spool cylinder part 4, and also by way of a branch passage 37 with a pressure inlet port 38 which is located in the spool cylinder part 4a.

The parts 36 and 38 are so located that, at one end of the stroke of the spool 7, the port 36 is closed by the spool land 8 while the port 38 communicates with the the spool working chamber 13a; at the other end of stroke of the spool, the port 36 communicates with the spool working chamber 12a while the port 38 is closed by the spool land 9, and in no position of the spool are both ports 36 and 38 simultaneously closed by pool lands 8 and 9 to the spool working chambers 12a and 13a respectively.

Located in the spool cylinder part 4 to be in permanent communication with the spool chamber 12a is a port 41 which communicates through a passage 42 with a port 43 opening into the bore 21b adjacent the piston chamber 25 and at a position axially between the end of piston cylinder 3 and the port 75. Located in the spool cylinder part 4a to be in permanent communication with the spool chanber 13a is a port 44 which communicates through a passage 45 with a port 46 opening into the bore 21b adjacent the piston chamber 26 and at a position axially between the end of the piston cylinder 3 and the port 77. The passage 42 also communicates by way of a branch passage 84 and a non-return valve 86 with a port 30 located in the piston chamber 25 at a position near to the end of piston cylinder 3. Similarly the passage 45 also communicates by way of branch passage 83 and a non-return valve 85 with a port 31 located in the piston chamber 26 at a position near to the end of piston cylinder 3. The non-return valves 85 and 86 (conveniently in the form of ball valves as illustrated) permit fluid to flow through the passages 83 and 84 respectively into the respective piston chambers 26 and 25 but do not permit fluid to flow in the reverse sense. The ports 30 and 31 are located to be in continual communication with the respective piston chambers 25 and 26 and for this purpose the ends of the piston cylinder in which the ports 30 and 31 are located are dimetrically enlarged as indicated at 66.

The motor is provided with an exhaust port 47 which communicates through a port 48 with the spool cylinder 2. The port 48 is located to be in constant communication with the spool transfer chamber 20. Also located in the spool cylinder 2 to be in permanent communication with the transfer chamber 20 is a port 49 which communicates through a passage 50 with a port 51 in the piston cylinder 3. The port 51 is positioned intermediate the ports 43 and 46 and is located to be in permanent communication with the piston transfer chamber 24.

Located in and towards the end of the spool cylinder part 5 adjacent the spool cylinder part 4 is a control port 52 which communicates through a passage 53 with a port 54 located in the piston cylinder 3 between the ports 51 and 31. The passage 53 has a branch passage 76 which communicates with the port 75. Located in and towards the end of the spool cylinder part 6 adjacent the spool cylinder part 4a is a further control port 55 which communicates through a passage 56 with a port 57 located in the piston cylinder 3 between the ports 51 and 30. The passage 56 has a branch passage 78 which communicates with the port 77.

The control port 52 is controlled by the spool land 10 and the control port 55 is controlled by the spool land 11; the spool lands 10, 11 and control ports 52, 55 are so arranged that, at one end of the stroke of the spool, the control port 52 is closed by the spool land 10 and the control port 55 communicates with the spool biasing chamber 17; at the other end of the stroke of the spool, the control port 55 is closed by the spool land 11 and the control port 52 communicates with the spool biasing chamber 15; and in no position of the spool are both control ports 52 and 55 simultaneously closed by the lands 10 and 11 to the spool biasing chambers 15 and 17 respectively.

The spool cylinder has a port 58 which is situated in the spool cylinder part 5 and is located between the ports 49 and 52; the port 58 communicates through a passage 59 with a port 60 in the piston cylinder 3, the port 60 being located between the ports 57 and 30 and towards the port 30. Provided in the spool cylinder part 6 is a port 61 which is located between the ports 49 and 55 and communicates through a passage 62 with a port 63 in the piston cylinder 3, the port 63 being located between the ports 54 and 31 and towards the port 31. Ports 58 and 61 are controlled to be opened and closed to communication with the transfer chamber 20 by spool lands 10 and 11 respectively. The spool lands 10, 11 and ports 58, 61 are so arranged that, at one end of the stroke of the spool, the port 58 communicates with the transfer chamber 20 while the port 61 is closed by the spool land 11; at the other end of the stroke of the spool, the port 61 communicates with the transfer chamber 20 while the port 58 is closed by the spool land 10; and in no position of the spool do both ports 58 and 61 simultaneously communicate with the transfer chamber 20. The spool lands 9, 11 and ports 38, 61 are so arranged that when port 38 is open to chamber 13a port 61 is closed by land 11, when port 61 is open to chamber 20 port 38 is closed by land 9, and in no position of the spool do both ports 38 and 61 simultaneously communicate with chambers 13a and 20 respectively. Similarly the spool lands 8, 10 and ports 36, 58 are so arranged that when port 36 is open to chamber 12a port 58 is closed by land 10, when port 58 is open to chamber 20 port 36 is closed by land 8, and in no position of the spool do both ports 36 and 58 simultaneously communicate with chambers 12a and 20 respectively.

The various diameters of the spool 7 are so arranged that the effective area at the end of the spool in the spool chamber 12a is equal to the effective area at the end of the spool in the spool chamber 13a; the effective pressure area of the spool side face 14 in the spool biasing chamber 15 (which, if the chamber 15 contained fluid under pressurer would cause the spool to be biased leftwardly in the drawing) is slightly less than the effective area of the spool side face 16 in the spool biasing chamber 17 (which, if the chamber 17 contained fluid under pressure would bias the spool rightwardly in the drawing); and the effective area of the side face 16 in the spool biasing chamber 17 is slightly less than the effective area of the end of the spool in either chambers 12a or 13a. For example, the effective area of the spool side face 16 may be 0.9 times the effective area of the end of the spool and the effective area of the spool side face 14 may be 0.8 times the effective area of the end of the spool.

The piston lands 22 and 23 are arranged with respect to the ports in the piston cylinder 3 so that at or towards one end of the stroke of the piston, the ports 57 and 60 communicate with the piston transfer chamber 24 and the ports 54 and 63 communicate with the piston chamber 26; at or towards the other end of the stroke of the piston the ports 54 and 63 communicate with the transfer chamber 24 and ports 57 and 60 communicate with the piston chamber 25; in no position of the piston is either port 30 or port 31 in communication with the transfer chamber 24; and in no position of the piston are both ports 54 and 57 either simultaneously closed by the piston lands 22 and 23 respectively or simultaneously open to communicate with the piston transfer chamber 24.

Located in the spool cylinder part 4 is a signalling port 67 which communicates with the spool biasing chamber 15 when the spool is located at the end of its stroke in the direction of arrow B and similarly located in the spool cylinder part 4a is a further signalling port 68 which communicates with the spool biasing chamber 17 when the spool is located at the end of its stroke in the direction of arrow A. The port 67 communicates with the chamber 15 by way of an annular recess 69 in the spool 7 and the port 68 communicates with the chamber 17 by way of an annular recess 70 in the spool 7. The ports 67, 68 and recesses 69, 70 are so located with respect to the ports 52 and 55 that, when the spool moves leftwardly from the end of its stroke and in the direction of arrow A, the signalling port 67 maintains communication with the spool biasing chamber 15 until the control port 52 is opened by the spool land 10 to communication with the spool biasing chamber 15, after which the signalling port 67 is closed by the spool land 8 and, when the spool moves rightwardly from the end of its stroke and in the direction of arrow B, the signalling port 68 maintains communication with the spool biasing chamber 17 until the control port 55 is opened by the spool land 11 to communicationo with the spool biasing chamber 17, after which the signalling port 68 is closed by the spool land 9.

The signalling port 67 communicates through a passage 71 with a port 72 in the bore 21b of the body part 1a at the end of the piston cylinder adjacent the port 43 and circumferentially spaced from the port 43. Similarly the signalling port 68 communicates through a passage 73 with a port 74 in the bore 21b of the body part 1a at the end of the piston cylinder adjacent the port 46 and circumferentially spaced from the port 46. The port 72 is located in the bore 21b substantially diametrically opposite (or in the same diametral plane as) the port 43 and the port 74 is located in the bore 21b substantially diametrically opposite (or in the same diametral plane as) the port 46.

The ports 43 and 72 are so positioned in the bore 21b that, as the piston 21 moves in the direction of arrow B, they are caused to communicate with each other and with the piston chamber 25 by way of the annular recess 27 in the piston rod 21a immediately before the port 60 is closed by the piston land 22 and thereafter, up to and including the physical limit of the piston stroke when the piston land 22 abuts the end of the piston cylinder 3 in the direction of arrow B, the port 43 is maintained in communication with port 72 through the recess 27. The axial length of annular recess 27 in the piston rod 21a is such that during the aforementioned end of stroke movement of the piston in the direction of arrow B, after the port 60 has been closed to communication with piston chamber 25, the ports 72 and 43 communicate through recess 27 with piston chamber 25 until the recess 27 is closed by bore 21b to communication with the chamber 25. Substantially simultaneously with (or immediately before) the recess 27 being closed to communication with the piston chamber 25, the port 75 is opened to communication with the recess 27 and therethrough with ports 72 and 43 until, and when, the end of stroke of the piston in the direction of arrow B is reached.

Similarly the ports 46 and 74 are so positioned in the bore 21b that, as the piston 21 moves in the direction of arrow A, they are caused to communicate with each other and with the piston chamber 26 by way of the annular recess 28 in the piston rod 21a immediately before the port 63 is closed by the piston land 23 and thereafter the port 46 is maintained in communication with port 74 through the recess 28 until, and when, the piston land 23 abuts the end of the piston cylinder 3. The axial length of annular recess 28 in the piston rod 21a is such that during the aforementioned end of stroke movement of the piston in the direction of arrow A, after the port 63 has been closed to communication with piston chamber 26, the ports 74 and 46 communicate through recess 28 with piston chamber 26 until the recess 28 is closed by bore 21b to communication with the chamber 26. Substantially simultaneously with (or immediately before) the recess 28 being closed to communication with the piston chamber 26, the port 77 is opened to communication with the recess 28 and therethrough with ports 74 and 46 until the end of the stroke of the piston in the direction of arrow A.

We will now consider a cycle of operation of the motor above described and illustrated. The inlet port 32 is connected to a source of hydraulic fluid under pressure and the exhaust port 47 is connected to a fluid reservoir.

Passages 32, 35 and 37 always contain fluid under pressure and, in the position of the motor illustrated with both the spool and piston respectively at, and approaching one end of their respective strokes, spool chamber 12a communicates with fluid under pressure by way of port 36 and the spool chamber 13a communicates with exhaust by way of port 44, passages 45 and 83, non-return valve 85, port 31, piston chamber 26, port 63, passage 62, spool transfer chamber 20 and passage 47 so that the spool is held at the end of its stroke in the direction of arrow A, while the piston chamber 25 communicates with fluid pressure by way of port 30, non-return valve 86, passages 84 and 42, and spool chamber 12a, and the piston chamber 26 communicates with exhaust by way of port 63, passage 62, spool transfer chamber 20 and passage 47 so that the piston is moving in the direction of arrow A.

The piston is shown with its land 22 opening port 57 to communication with piston chamber 25 (which is without effect since the ports 55 and 77 are closed by spool land 11 and piston rod 21a respectively). Further movement of the piston causes the piston land 23 to close the port 54 to the piston chamber 26 and re-open it to the piston transfer chamber 24 and thereby exhaust.

Towards the end of the stroke of the piston in the direction of arrow A, the ports 46 and 74 and piston chamber 26 are placed in communication through the piston recess 28 immediately before the piston land 23 closes port 63. When the piston land 23 closes port 63 during movement of the piston in the direction of arrow A, piston chamber 26 is in communication with the spool working chamber 13a by way of piston recess 28, port 46, passage 45 and port 44 and with the spool biasing chamber 17 by way of piston recess 28, port 74, passage 73 and port 68. As the piston continues to move in the direction of arrow A, the pressure in piston chamber 26 and in the passages to the spool working and biasing chambers 13a and 17 is increased to a level where the force exerted by this pressure on the spool faces in the chambers 13a and 17 is sufficient to overcome the forces holding the spool 7 at its end of stroke in the direction of arrow A (that is the forces due to system fluid pressure in the spool working chamber 12a, exhaust back pressure in the spool biasing chamber 15 and friction). When the aforementioned level of pressure is reached, as the piston continues to move in the direction of arrow A, fluid is displaced from the piston chamber 26 into the spool working and biasing chambers 13a and 17 to move the spool in the direction of arrow B. Fluid is displaced from the contracting piston chamber 26 by way of the annular recess 28 into the spool chambers 13a and 17 for so long as the recess 28 communicates between the ports 46, 74 and the piston chamber 26 and this displacement of fluid from the piston chamber 26 is so arranged (by suitable dimensioning of the spool and piston diameters, areas and port positions) that the spool moves sufficiently to open the port 38 to spool working chamber 13a (and preferably sufficiently to close port 36 to spool working chamber 12a) before the annular recess 28 is closed by the bore 21b to communication with the piston chamber 26.

During movement of the spool in the direction of arrow B, control port 55 is opened to the spool biasing chamber 17, (prior to the signalling port 68 being closed by spool land 9) to move the spool to the other end of its stroke. By movement of the spool in the direction of arrow B, port 61 is closed to the spool transfer chamber 20 by spool land 11 and immediately thereafter the port 38 is opened by the spool land 9 to the spool working chamber 13a; port 36 is closed by the spool land 8 immediately prior to port 58 being opened by the spool land 10 to communication with the spool transfer chamber 20 and signalling port 67 being opened to communication with the spool biasing chamber 15 by way of spool recess 69. The ports 38 and 61 are located with respect to the spool lands 9 and 11 and the ports 36 and 58 are located with respect to the spool lands 8 and 10 so that in no position of the spool are both ports 38 and 61 simultaneously open and in no position of the spool are both ports 36 and 58 simultaneously open. As the control port 55 is being opened to the spool biasing chamber 17 by spool land 11, control port 52 is being closed to the spool biasing chamber 15 by spool land 10 and when the spool is located at its end of stroke position in the direction of arrow B control port 55 is fully open and control port 52 is closed.

With the spool at the end of its stroke in the direction of arrow B, port 36 is closed by spool land 8 and consequently spool working chamber 12a and passage 42 are not open to fluid under pressure and the piston chamber 25 communicates with exhaust by way of port 60, passage 59 and port 58 which is open to the spool transfer chamber 20. The spool biasing chamber 15 is closed to exhaust and to fluid pressure since control port 52 is closed by spool land 10 and port 72 is closed by the piston rod 21a. The piston chamber 26 communicates with fluid pressure by way of port 31, valve 85, passage 45, chamber 13a and port 38 and consequently the piston moves in the direction of arrow B.

During initial movement of the piston 21 in direction of arrow B the port 63 is closed by the piston land 23 from piston transfer chamber 24 and re-opened to the piston chamber 26 and thereby fluid under pressure (however, since the port 61 of passage 62 is closed by the spool land 11, this is without effect). Continued movement of the piston in direction B causes piston land 23 to close port 54 and re-open it (and therethrough the passages 53 and 76) to the piston chamber 26 and thereby fluid pressure and thereafter causes piston land 22 to close port 57 and re-open it to the piston transfer chamber 24 and thereby exhaust. The passages 53 and 76 now contain fluid under pressure and the spool biasing chamber 17 and passage 78 communicate with exhaust by way of port 55, passage 56 and piston transfer chamber 24. Further movement of the piston causes the piston land 22 to close port 60 from the piston chamber 25 and re-open it to the piston transfer chamber 24 and thereby exhaust. However, immediately before the piston land 22 closes port 60, the ports 43 and 72 and piston chamber 25 are placed in communication by way of the piston recess 27.

When the piston land 22 closes port 60 during movement of the piston in direction B, piston chamber 25 is in communication with the spool working chamber 12a by way of piston recess 27, port 43, passage 42 and port 41 and with the spool biasing chamber 15 by way of piston recess 27, port 72, passage 71 and port 67. As the piston continues to move in the direction of arrow B, the pressure in piston chamber 25 and in the passages to the spool working and biasing chambers 12a and 15 is increased to a level where the force exerted by this pressure on the spool faces in the chambers 12a and 15 is sufficient to overcome the forces holding the spool 7 at its end of stroke in the direction of arrow B (that is the forces due to system fluid pressure in the spool working chamber 13a, exhaust back pressure in the spool biasing chamber 17 and friction). When the aforementioned level of pressure is reached, as the piston continues to move in the direction of arrow B, fluid is displaced from the piston chamber 25 into the spool working and biasing chambers 12a and 15 to move the spool in the direction of arrow A. Fluid is displaced from the contracting piston chamber 25 by way of the annular recess 27 into the spool chambers 12a and 15 for so long as the recess 27 communicates between the ports 43, 72 and the piston chamber 25 and this displacement of fluid from the piston chamber 25 is so arranged (by suitable dimensioning of the spool and piston diameters, areas and port positions) that the spool moves sufficiently to open the port 36 to spool working chamber 12a (and preferably sufficiently to close port 38 to spool working chamber 13a) before the annular recess 27 is closed by the bore 21b to communication with the piston chamber 25.

During movement of the spool 7 in the direction of arrow A, the spool land 10 opens control port 52 to communication with the spool biasing chamber 15 immediately before the signalling port 67 is closed by spool land 8 and the port 58 is closed by the spool land 10 immediately prior to the port 36 being opened to the spool working chamber 12a by the spool land 8. As port 36 is being opened by spool land 8, port 38 is being closed by spool land 9 until the spool reaches the end of its stroke in the direction of arrow A as illustrated.

The piston chamber 25 now communicates with fluid pressure by way of port 30, valve 86 and passage 42 to chamber 12a while the piston chamber 26 communicates with exhaust by way of port 63, passage 62, port 61 and the spool transfer chamber 20 so that the piston commences to move in the direction of arrow A. Port 57 communicates with the piston transfer chamber 24 and thereby exhaust while the port 54 communicates with the piston chamber 26 and thereby exhaust.

Further movement of the piston in the direction of arrow A causes the piston land 22 to close port 57 to piston transfer chamber 24 and re-open it to piston chamber 25 and thereby fluid under pressure is applied to the passages 56 and 78. Continued movement of the piston causes the piston land 23 to close port 54 to the piston chamber 26 and re-open it to the piston transfer chamber 24 which maintains passages 53 and 76 in communication with exhaust and the motor commences a further cycle of operation.

It is mentioned above that with the spool 7 in the position illustrated and the piston 21 moving in the direction of arrow A and with the piston land 23 just closing port 63, the spool chambers 13a and 17 are pressurized and expanded to displace the spool rightwardly by pressure fluid displaced from the piston chamber 26 and through passages 45 and 73 by way of annular recess 28. However, when the piston 21 has moved sufficiently in the direction of arrow A so that the bore 21b cuts-off communication between the recess 28 and the piston chamber 26, the non-return valve 85 is closed (if it has not already closed) by fluid pressure which develops in the piston chamber 26 and the fluid remaining in the piston chamber 26 is thereby trapped and provides a 'dashpot' or similar fluid arresting arrangement for the piston at the end of its stroke in the direction of arrow A. Similarly, with the spool at the end of its stroke in the direction of arrow B and the piston moving in the direction of arrow B, when the piston has moved sufficiently so that bore 21b cuts-off communication between recess 27 and the piston chamber 25, the non-return valve 86 is closed (if it has not already closed) by fluid pressure which develops in the piston chamber 25 and the fluid remaining in the piston chamber 25 is thereby trapped and provides a 'dashpot' or similar fluid arresting arrangement for the piston at the end of its stroke in the direction of arrow B. By this arrangement the kinetic energy of the piston (and of a load which it may carry) is dissipated in compressing the fluid in the 'dashpot' formed at the respective end of piston stroke and the energy stored in the compressed fluid is then released in accelerating the piston (and its load) in the opposite direction of piston stroke. In theory, provided that no fluid is lost by leakage from a 'dashpot', the piston would be accelerated after its reversal to leave the 'dashpot' at the same speed as that at which it entered. In practice fluid losses occur, however, irrespective of this the abovementioned technique of arresting and reversing the piston at its end of stroke has been found to provide a rapid and efficient reversal of the piston.

During the period for which the 'dashpots' are operative (that is when the annular recesses 27 and 28 are closed by the bores 21b to the respective piston chambers 25 and 26), the spool will have moved sufficiently to open the appropriate spool working chamber 12a or 13a to fluid pressure by way of port 36 or 38 respectively; consequently the spool will complete its stroke from one end to the other by fluid pressure from the pressure inlet 32. Further, after the piston has reversed, the pressure in the expanding 'dashpot' will decrease while the piston is accelerating until eventually the fluid pressure in the appropriate passage 42 or 45 exceeds that in the expanding piston chamber 25 or 26 respectively and the non-return valve 86 or 85 respectively opens to allow fluid under pressure from the inlet 32 to enter the expanding piston chamber and complete the piston stroke.

In addition to improving the period taken for the piston to reverse its stroke (that is by decreasing the time taken for the piston to make a change in direction of its axial movement), the provision of the non-return valves and associated dashpots as above described have been found to provide other advantages which alleviate several problems frequently encountered in the design of fluid pressure operated reciprocating motors. Firstly the length of piston stroke is less affected by the kinetic energy of the piston (and a load which it may carry). The fluid pressure source (usually a hydraulic pump) connected to the inlet 32 is isolated from high peak pressures developed in the piston chamber 25 and 26 at reversal of the piston. The efficiency of the motor is believed to be increased as the 'dashpots' developed in the arresting chambers can act as "liquid springs" from which the piston can 'bounce' at its end of stroke with minimum loss of energy. This latter feature and that of the fluid pressure pump being isolated from high peak pressures in the piston chambers at reversals of the piston as above mentioned, are believed to afford a lower power consumption and lead to less heat generation by the motor. Accurate control of spool movement is provided, particularly since the possibility of the spool moving from an end of its stroke position too soon due to high back pressure in the contracting piston chamber is eliminated. In effect the interaction between the ports 46, 74 and piston recess 28 (and similarly between the ports 43, 72 and piston recess 27) constitute an auxiliary valve which controls the timing at which the spool biasing chamber 15 (and 17) and spool working chamber 12a (and 13a) are pressurized to reverse the spool and as such may be replaced by other forms of valve means as will be apparent to persons skilled in the art (for example electrically controlled valves) which are responsive to the position of the piston in its cylinder so that the spool biasing chamber 15 and spool working chamber 12a are automatically pressurized immediately prior to port 60 being closed by land 22 during movement of the piston in the direction of arrow B. Also, the spool biasing chamber 17 and spool working chamber 13a are automatically pressurized immediately prior to port 63 being closed by land 23 during movement of the piston in the direction of arrow A.

Although in the illustrated embodiment the spool working chamber and associated spool biasing chamber which, when pressurized, tend to move the spool in the same sense of axial direction are arranged to be pressurized simultaneously, if required the spool biasing chamber may be pressurized slightly before or after the spool working chamber associated therewith by appropriate axial displacement of the ports 46 and 74 and ports 43 and 72 (for example in the drawing ports 46 and 43 may be moved axially nearer ports 77 and 75 respectively).

If a condition even occurs (for example, during assembly of the motor) in which the piston is located at an extreme end of its stroke (i.e. when one of the annular recesses 27, 28 is closed to its respectively adjacent piston chamber 25, 26 by the bore 21b) then fluid pressure in the piston chambers 25 and 26 and in the passages 45 and 73 (or passages 42 and 71 as the case may be) cannot be equalized by equal and opposite reaction through the piston and in such a condition the spool will not reverse and the motor will stall. To alleviate such a condition, the passages 76 and 78 and respective ports 75 and 77 are provided which are adapted to communicate with the annular recesses 27 and 28 in the piston rod 21a and through said recesses 27 and 28 with ports 43, 72 and 46, 74 respectively when the piston is at or towards one or other of said extreme ends of its stroke. If the condition now arises in which the piston is at an extreme end of its stroke, say in the direction of arrow A in the drawing, fluid under pressure in the passage 78 can now communicate through port 77, recess 28, ports 46 and 74, and passages 45 and 73 with the spool working chamber 13a and spool biasing chamber 17 respectively to move the spool in the direction of arrow B. Similarly, when the piston is located at the extreme end of its stroke in the direction of arrow B, fluid under pressure in the passage 76 can now communicate through port 75, recess 27, ports 43 and 72, and passages 42 and 71 with the spool working chamber 12a and the spool biasing chamber 15 respectively to move the spool in the direction of arrow A.

The co-operation between the annular recesses 27, 28 and associated ports 75, 43, 72, 46, 74, 77 effectively constitute valves and can be replaced by alternative forms of valve means as will be apparent to persons skilled in the art and which are automatically actuated to equalize fluid pressure in the spool working chambers 12a, 13a and in the appropriate one of the spool biasing chambers 15 or 17 to reverse the spool in the event of the piston 21 coming to rest at, or being assembled in, one or other of the extreme ends of its stroke.

In fluid pressure operated motors, a condition in which stalling is most likely to occur is that in which the piston and/or spool are located in their respective cylinders at the center of oscillation. In the above described embodiment assume that the piston 21 is located so that port 57 communicates with piston chamber 25 and port 54 communicates with piston chamber 26 (i.e. as illustrated); that the spool 7 is located so that control port 52 communicates with the spool biasing chamber 15 and control port 55 communicates with the spool biasing chamber 17; that ports 36 and 38 are partly open to their respective spool working chambers 12a, 13a and that ports 58 and 61 are closed by the spool lands 10 and 11 respectively. In such a condition the piston chamber 26 contains fluid under pressure by way of spool working chamber 13a, passage 45, valve 85 and port 31 and consequently spool biasing chamber 15 contains fluid under pressure by way of passage 53, while spool biasing chamber 17 communicates with the piston chamber 25 by way of port 55, passage 56 and port 57 and the piston chamber 25 contains fluid pressure by way of spool chamber 12a (which is open to fluid pressure), passage 42, valve 86 and port 30. Consequently, the pressure of fluid in the chambers 25, 26, 15, 17, 12a and 13a is equalized. However, since the areas of the spool end faces in chambers 12a and 13a are equal and the effective area on the spool side face 16 is slightly larger than the effective area on the spool side face 14, the spool is pressure biased and moves in the direction of arrow B to the end of its stroke and a stalled condition of the motor is thereby avoided.

If required the passages 76 and 78 may be provided with restrictors 76a and 78a respectively. The restrictors 76a and 78a may be required to ensure that at the point of reversal of the piston say, when recess 28 communicates between ports 77, 46 and 74 (or recess 27 communicates between ports 72, 43 and 75) and the spool has initially moved from one end of its stroke in the appropriate direction to open the port 44 (or port 41) to pressure by way of port 38 (or port 36) and also to open port 58 (or port 61) to exhaust by way of the spool transfer chamber 20, there is a sufficient differential in pressure between the pressure in passage 45 (or passage 42) and that in passage 78 (or passage 76) on the side of the restrictor 78a (or restrictor 76a) remote from port 77 (or port 75) to ensure that sufficient pressure is maintained in the spool working chamber 13a (or spool working chamber 12a) to move the spool in the appropriate direction to the other end of its stroke and in the piston working chamber 26 (or piston working chamber 25) until the piston has moved sufficiently for recess 28 (or recess 27) to be out of communication with port 77 (or port 75).

In a modification (not shown) of the motor as above described and illustrated, the branch passages 76 and 78 are omitted (together with the restrictors 76a and 78a when provided) and the ports 75 and 77 are connected through appropriate passages to be in constant communication with fluid pressure at the inlet 32, for example the port 75 may be in constant communication through a passage with the port 36 and the port 77 may be in constant communication through a passage with the port 38.

What we claim is:

1. A fluid pressure operated motor for producing reciprocating motion including a spool axially slidable in a spool cylinder, the spool defining with the spool cylinder a pair of spool working chambers and a piston axially slidable in a piston cylinder, the piston defining with the piston cylinder a pair of piston chambers in which each of the pair of spool working chambers is respectively in communication with one of the pair of piston chambers by way of a non-return valve which opens communication between its associated spool working chamber and piston chamber when fluid pressure in the spool working chamber exceeds that in the associated piston chamber and closes communication between its associated spool working chamber and piston chamber when fluid pressure in the piston chamber exceeds that in the associated spool working chamber; each piston chamber has an exhaust port which is so located that, during axial movement of the piston, the one of such exhaust ports, through which the contracting piston chamber is exhausting is closed by the piston towards its end of stroke; and wherein valve means is provided which is responsive to axial movement of the piston, said valve means being adapted to open communication between the contracting piston chamber and the spool working chamber associated therewith so that fluid displaced from the contracting piston chamber acts at least partly to reverse the spool when the said exhaust port associated with the contracting piston chamber is closed, and subsequently to close communication between the contracting piston chamber and the spool working chamber associated therewith prior to the piston reaching its end of stroke so that, with the non-return valve associated with the contracting piston chamber closed and the said valve means closed, the fluid in said piston chamber is trapped to provide a dashpot arrangement for arresting the piston at its end of stroke.

2. A fluid pressure operated motor as claimed in claim 1 wherein, after the direction of axial movement of the piston has been reversed, fluid under pressure is passed into the expanding piston chamber by way of the non-return valve associated therewith and such non-return valve and the spool working chamber with which it communicates are arranged to be in communication with fluid under pressure as a result of displacement of the spool.

3. A fluid pressure operated motor as claimed in claim 1 wherein each non-return valve is in constant communication with its respectively associated piston chamber.

4. A fluid pressure operated motor as claimed in claim 1 wherein the valve means comprises co-operating ports and lands between the piston and its cylinder.

5. A fluid pressure operated motor as claimed in claim 1 wherein the spool and spool cylinder together further define a pair of spool biasing chambers and wherein the valve means is adapted to open communication between the contracting piston chamber and the spool working and biasing chambers associated therewith so that fluid displaced from the contracting piston chamber acts at least partly to reverse the spool when the exhaust port associated with the contracting piston chamber is closed, and subsequently to close communication between the contracting piston chamber and the spool working and biasing chambers associated therewith prior to the piston reaching its end of stroke.

6. A fluid pressure operated motor as claimed in claim 5 wherein the valve means is arranged to open communication simultaneously between the contracting piston chamber and the spool working and biasing chambers associated with said contracting piston chamber.

7. A fluid pressure operated motor as claimed in claim 5 wherein the valve means is arranged to open communication between the spool biasing chamber and the contracting piston chamber slightly before it opens communication between the spool working chamber and the contracting piston chamber.

8. A fluid pressure operated motor as claimed in claim 1 wherein the valve means comprises co-operating ports and lands between a piston rod and a bore through which it is slidable.

9. A fluid pressure operated motor in which a spool axially slidable in a spool cylinder adjusts during its sliding movement valve means which controls fluid flow to a first fluid pressure means for effecting reciprocation of a piston which is axially slidable in a piston cylinder and in which means, actuable by the piston at a predetermined position of the piston in its cylinder, determines the adjustment of said valve means which controls fluid flow to a second fluid pressure means for effecting axial movement of the spool, and wherein said first pressure means includes a piston chamber formed by the piston and its cylinder to be alternately expanded and contracted during reciprocation of the piston, the piston chamber having associated therewith a first port and a second port, said first port being so arranged that fluid in the piston chamber can exhaust therethrough during axial movement of the piston in a sense to contract the piston chamber and being controlled by the piston to be closed to the piston chamber towards the end of stroke of the piston in a sense to contract the piston chamber, said second port being in substantially continual communication with the piston chamber and in constant communication with a non-return valve, the arrangement being such that fluid under pressure, as directed by said valve means, can flow into the piston chamber by way of the non-return valve and the second port when the first port is closed by the piston, whereby with the piston approaching its end of stroke consistent with the piston chamber being contracted and the first port closed to the piston chamber, the fluid in the piston chamber becomes trapped to provide a dashpot arrangement for arresting the piston at its said end of stroke and fluid under pressure, directed by said valve means, is passed into said contracted piston chamber to move the piston towards the other end of its stroke by way of the non-return valve and second port.

10. A fluid pressure operated motor as claimed in claim 9 wherein the piston chamber has the non-return valve associated with the second port thereof adapted to communicate, under control of said valve means, intermittently with fluid pressure.

11. A fluid pressure operated motor as claimed in claim 9 wherein the piston chamber has the non-return valve associated with the second port thereof adapted to communicate, under the control of said valve means, alternately with fluid pressure and with exhaust.

12. A fluid pressure operated motor as claimed in claim 12 wherein the piston is pressure biased and the piston chamber constitutes a variable pressure piston chamber and both the first port and the non-return valve associated with said variable pressure piston chamber are adapted to communicate alternately with fluid pressure and with exhaust.

13. A fluid pressure operated motor in which a spool axially slidable in a spool cylinder adjusts during its sliding movement valve means which controls fluid flow to a first fluid pressure means for effecting reciprocation of a piston which is axially slidable in a piston cylinder and in which means, actuable by the piston at a predetermined position of the piston in its cylinder, determines the adjustment of said valve means which controls fluid flow to a second fluid presssure means for effecting axial movement of the spool, and wherein said first pressure means comprises two axially spaced piston chambers formed by the piston and its cylinder to be alternately expanded and contracted respectively during reciprocation of the piston, each said piston chamber having associated therewith a first port and a second port, each said first port being so arranged that fluid in the piston chamber associated therewith can exhaust therethrough during axial movement of the piston in a sense to contract that piston chamber and being controlled by the piston to be closed to its associated piston chamber towards the end of stroke of the piston in a sense to contract that piston chamber, each said second port being in substantially continual communication with its associated piston chamber and in contant communication with a non-return valve, the arrangement being such that fluid under pressure, as directed by said valve means, can flow into each piston chamber by way of the non-return valve and second port associated therewith when the first port associated with that piston chamber is closed by the piston, whereby with the piston approaching an end of its stroke and the first port associated with the contracting piston chamber closed to that piston chamber, the fluid in that piston chamber becomes trapped to provide a dashpot arrangement for arresting the piston at its said end of stroke and fluid under pressure, directed by said valve means, is passed into said contracted piston chamber to move the piston towards the other end of its stroke by way of the non-return valve and second port associated therewith.

14. A fluid pressure operated motor as claimed in claim 1 in which the spool has a first pair of opposed faces each of which respectively partly defines one of the pair of spool working chambers in the spool cylinder and a second pair of opposed faces each of which respectively partly defines one of a pair of spool biasing chambers in the spool cylinder, said valve means controlling fluid flow to the spool working chambers and spool biasing chambers and being arranged to control said fluid flow to determine the timing of reversal of the spool according to the position of the piston so that, with the spool at one end of its stroke, one spool working chamber is open to fluid pressure while the other spool working chamber is open to exhaust to urge the spool to that end and one spool biasing chamber is open to exhaust and, to reverse the spool, fluid pressure in both spool working chambers is caused to apply equal and opposite axial thrusts on the spool and fluid pressure is caused to be admitted to the other spool biasing chamber in opposition to the load on the spool applied by fluid pressure in said one spool working chamber, and wherein the valve means is arranged to open communication between the contracting piston chamber and one each of the spool working and biasing chambers which are associated with the contracting piston chamber so that fluid displaced from the contracting piston chamber acts in said associated spool working and biasing chambers at least partly to reverse the spool when the exhaust port associated with the contracting piston chamber is closed, and subsequently to close communication between the contracting piston chamber and the spool working and biasing chambers associated therewith prior to the piston reaching its end of stroke.

* * * * *